Oct. 22, 1940.　　　G. E. MILLER　　　2,218,826
CLUTCH
Filed Sept. 27, 1938　　　3 Sheets-Sheet 1
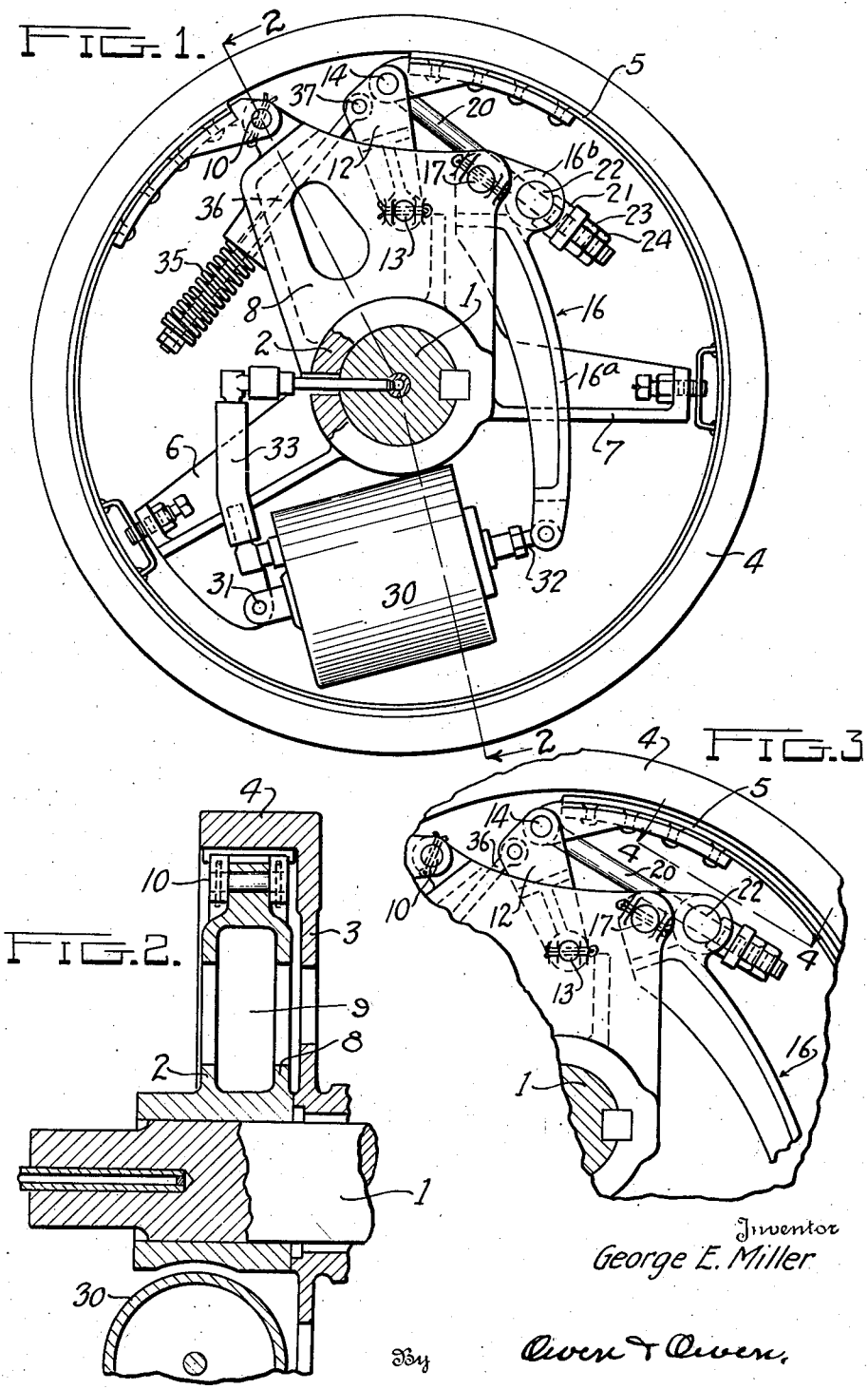
Inventor
George E. Miller
By Owen & Owen
Attorneys Oct. 22, 1940.  G. E. MILLER  2,218,826
CLUTCH
Filed Sept. 27, 1939  3 Sheets-Sheet 2

Inventor
George E. Miller
By Owen & Owen
Attorneys

Oct. 22, 1940.  G. E. MILLER  2,218,826
CLUTCH
Filed Sept. 27, 1938  3 Sheets-Sheet 3
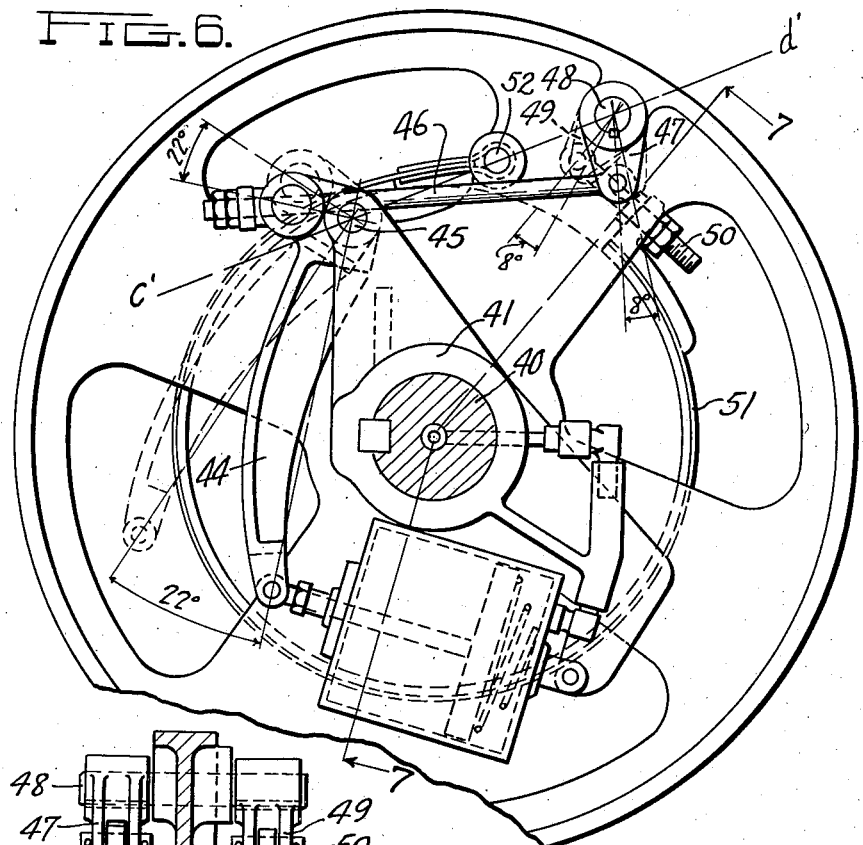
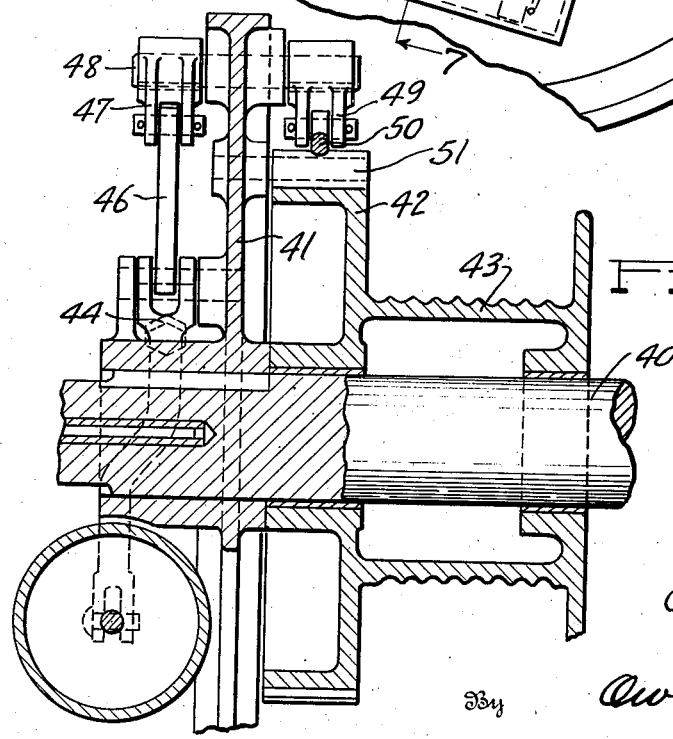
Inventor
George E. Miller
By Owen & Owen
Attorneys Patented Oct. 22, 1940

2,218,826

UNITED STATES PATENT OFFICE 2,218,826

CLUTCH

George E. Miller, Findlay, Ohio, assignor to The Buckeye Traction Ditcher Company, Findlay, Ohio, a corporation of Ohio Application September 27, 1938, Serial No. 231,947

3 Claims. (Cl. 192—77)

This invention relates to clutches of both the internal expansion and external contraction types.

The object of the invention is the provision, in clutches of this character, of improved means for applying the clutch, whereby a powerful engaging action of the clutch is obtained by a comparatively low pressure applying force, and the engaging force is rapidly and materially increased during the applying action without any increase of the applying force.

Further objects and advantages of the invention will be apparent from the following detailed description thereof, and from the accompanying drawings, in which—

Figure 5:
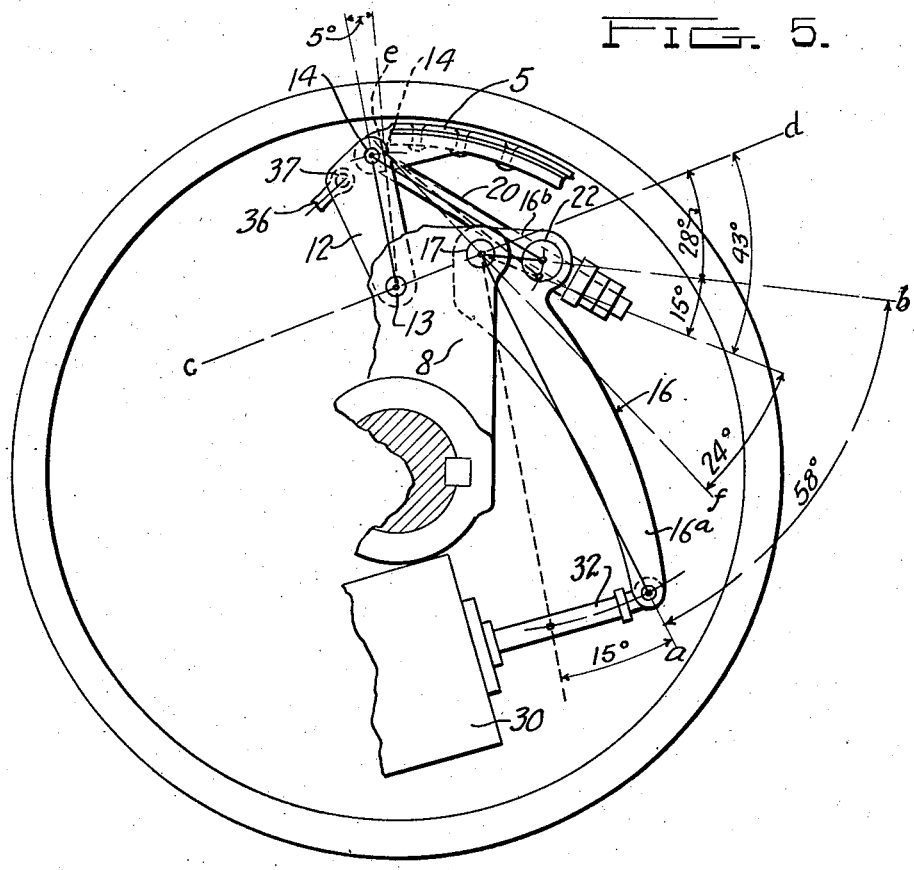
Figure 4:
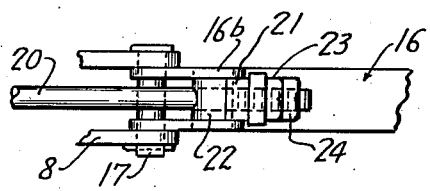

Figure 1 is a side elevation of a clutch of the internal type embodying the invention, with the parts in applied position and with a portion in section; Fig. 2 is a fragmentary section on the line 2—2 in Fig. 1; Fig. 3 is a fragmentary view similar to Fig. 1, with the clutch control parts in released position; Fig. 4 is a sectional view on the line 4—4 in Fig. 3; Fig. 5 is a diagrammatical view of the operative parts of the clutch; Fig. 6 is a side elevation of a clutch of the external type embodying the invention, with the parts shown in full lines in applied position and with a portion broken away, and Fig. 7 is a section on the line 7—7 in Figure 6.

Referring to Figs. 1 to 4 of the drawings, 1 designates a drive shaft and 2 and 3 the drive and driven members of a clutch, the former being fixed and the latter loose on the shaft.

The member 3 has a laterally extending rim portion 4, which is internally engaged by an expansible clutch band 5 peripherally carried by the member 2. In the present instance, the member 2 is of spider form, having arms 6, 7 and 8, with the latter broader than the others circumferentially of the members, as shown. The arm 8 is also broad axially of the clutch and is hollow to provide a chamber 9 therein, with a portion of its outer end and one edge open. One end of the band 5 is anchored to the spider arm 8, as at 10, and its other end is movably connected to such arm through an intermediate power applying and release mechanism, as hereinafter described.

The applying mechanism includes a rocker arm 12 which is pivoted at its inner end to the spider arm 8 within the chamber 9, at 13, and has its outer end projecting out through the open end of said chamber and pivotally attached to the free end of the band 5, at 14.

A power lever 16 is fulcrumed within the open edge portion of the arm 8 near its outer end at 17, such fulcrum being preferably disposed approximately one-third of the distance inwardly from the rim 4 to the clutch axis and at the inner side of the rocker arm 12 with respect to the free end of the clutch band. The lever 16 is of bell crank form, having the long arm 16ª and short arm 16ᵇ with their longitudinal axial lines $a$ and $b$, respectively, approximately 58° apart, and with the short arm disposed at the rim side of the long arm, as shown, and forked.

A draft link 20 is pivoted to the free end of the band 5 and to the rocker arm 12, as at 14, and extends therefrom through the fork lever arm 16ᵇ lengthwise thereof, and has a thrust collar 21 thereon in inward thrust coaction with a cross pivot pin 22, which is mounted in and connects the furcations of said lever arm. The position of the collar 21 on the link is adjusted by a nut 23 and this is held in adjusted position by a lock nut 24. The link 20 crosses over the fulcrum axis of the lever 16 in close relation thereto the fulcrum pin 17 being cut out or recessed at the point where the link crosses it for such purpose, so that the arcuate movement of the axis of the pivot pin 22 during a clutch applying movement of the lever is at the opposite side of the lever fulcrum axis to the rocker arm connection 14, and is from a point approximately 27° past a line $c$—$d$, cutting the axes of the fixed pivots 13 and 17 to a point approximately 43° past such line, as shown diagrammatically in Fig. 5. The length of the arcuate movement of the lever 16 is, therefore, in the present embodiment of the invention, approximately 16°, and such arc, in applying direction, extends approximately to a point 24° short of a line $e$—$f$, cutting the axes of the two pivots 14 and 17, when the link is in full applied position.

The rocker-arm 12 manually swings slightly to the left from a radial line of the clutch, which intersects the pivot 13, and, during an application of the clutch, swings to the right approximately 5°. It is thus apparent that while the swing of the lever 16 during an application of the clutch is through an arc of approximately 16°, the lengthwise movement of the link 20 is very short, being only sufficient to swing the rocker arm 12 through an arc of approximately 5°. It is also apparent that the lengthwise movement of the link 20 gradually lessens as the applying swing of the lever pivot 22 takes place, due to the nearness of said pivot to a line intersecting the pivots 14 and 17. This arrangement not only very materially increases the clutch engaging action over the force applied to the lever 16, but such force increases from the beginning to the end of the applying stroke of the lever with a constant pressure exerted on the lever.

A constant clutch engaging force, in the present instance, is applied to the outer end of the long arm of the lever 16 pneumatically through a cylinder and plunger connection between the spider 2 and lever. This connection includes a cylinder 30 pivotally anchored at one end to said spider, as at 31, and containing a plunger (not shown), the stem 32 of which projects from the opposite end of the cylinder and is pivotally connected to the free end of the long arm of said lever. This connection is at the inner side of the lever arm 16ᵃ, so that an inward movement of the plunger exerts an inward or clutch applying movement to the lever. The interior of the cylinder at the opposite side of the plunger to the stem 32 is in connection with a suitable controlled vacuum source through a connection 33, a part of which extends through the shaft 1 axially thereof. It is apparent that when the cylinder is open to the vacuum source, a clutch applying movement will be imparted to the lever 16.

The clutch band 5 is normally held in released position by a coiled expansion spring 35, which acts through a rod 36 on the lever arm 12. The rod 36, in the present instance, is connected to the rocker arm 12, as at 37, and extends therefrom crosswise of the clutch axis through an opening in the closed side edge portion of the spider arm 8, and the spring 35 is mounted thereon at the outer side of the arm 8 with its inner end thrust against such arm and its outer end thrust against the outer end of the link.

In the application of the invention to an external type clutch, as shown in Figs. 6 and 7, the arrangement, operation and construction of the parts are substantially the same as in the internal application, except that in the illustrated embodiment of the former the rocker member which is connected to the clutch band is a bell crank instead of single arm form.

In the present embodiment of this external embodiment of the invention (Figs. 6 and 7), 40 is the drive shaft, 41 the drive member of the clutch, which is keyed to the shaft, and 42 the driven member, which, in the present instance, forms part of a drum 43 mounted loosely on the shaft and is disposed at the opposite side of the spider portion of the drive member to the clutch control mechanism.

The power lever 44 of the clutch is fulcrumed to the drive member at 45 and has its short arm connected by a draft link 46 to a rocker arm 47 forming part of a bell crank lever. The shaft 48 for the arm is journaled in the outer portion of the drive member 41 parallel to its axis and at the opposite side of said drive member has a second arm 49 fixedly projecting inwardly therefrom and connected through a link 50 to the free end of the clutch band 51. This band encircles the driven clutch member 42 and is anchored at its opposite end to the member 41 at 52.

The connection of the power lever 44 to the link 46 and the relationship of such lever and link and of the rocker arm 47 are substantially the same as the connection and relationship of the corresponding parts 16, 20 and 12 of the first described form.

The major difference in the present clutch operating mechanism over that of the expanding or internal type resides in the connection between the draft link 46 and clutch band 51, wherein a pull on such link effects a contraction of the clutch band instead of an expansion thereof, as in the expanding type. In the present type, the rocking axes of the lever fulcrum 45 and shaft 48, intersected by the line $c'-d'$, constitute the fixed points corresponding to the respective fixed points 17 and 13, intersected by the line $c-d$, of the other form, and the movement of the parts with respect to these points in the two forms is substantially the same. In the present layout of the two forms, it will be noted that the arc of movement of the rocker arm 47 in the external form is slightly greater than that of the rocker arm 12 of the internal form, thus necessitating a correspondingly greater applying movement of the power lever 44 than the power lever 16. It will also be noted that in the present embodiment of the external type the axis of the rocker arm 47 is outside of a circle described by the band 51 and that the rocker arms 47 and 49 extend inward from their rocking axes instead of outward therefrom, as is the case of the rocker arm 12 in the illustrated embodiment of the internal type clutch.

In both forms, however, an inward pull on the power lever applies the clutch and the connection of the lever with its draft link moves through a very short arc, which is disposed at the opposite side of the lever fulcrum to the point of connection of the draft link with its rocker arm.

I wish it understood that my invention is not limited to any specific construction, arrangement or form of the parts, except as limited by the scope of the claims.

Having thus described my invention, what I claim as new, and desire to secure by United States Letters Patent, is:

1. In a clutch, a drive member and a driven member, a normally released clutch band carried by the drive member and movable to engage the other member, said band having one end anchored to the drive member, a rocker arm and a lever carried on relatively fixed pivots by the drive member with the lever pivot disposed between the arm pivot and said band adjacent to the free end thereof, said arm extending outward from its pivot toward and connected to the free end of said band, a draft link connecting the outer end portion of said arm and said lever, said link extending crosswise of the pivotal axis of the lever and the longitudinal axis of the link being located in a plane substantially tangential to the pivotal axis of the lever in declutched position of the parts and in clutched position of the parts being disposed substantially in a plane diametrical to the longitudinal axis of the pivot of the lever, said draft link being connected to the lever at the opposite side of such axis to its connection with the arm, and means connected to the lever and operable to move the lever to impart a clutch applying movement to said arm through said draft link.

2. In a clutch, a drive member and a driven member, a normally released clutch band carried by the drive member and movable to engage the driven member, said band having one end anchored to the drive member, a power lever and a second lever both of bell crank form carried by the drive member on relatively fixed pivots, said power lever having a short arm projecting from its fulcrum in a direction away from said second lever, said second lever having one arm connected to the free end of said band, a draft link connecting one arm of said second lever to the opposing arm of said power lever, said link extending across the power lever fulcrum in close relation thereto to cause a slight arcuate movement of the power lever to impart a powerful clutch-applying movement to said second lever, the longitudinal axis of the link being located in a plane substantially tangential to the power lever fulcrum in declutched position of the parts and in clutched position of the parts being disposed substantially in a plane diametrical to the longitudinal axis of the fulcrum of the power lever, and means connected to said power lever and operable to move it to apply the clutch.

3. In a clutch, a driving member and a driven member, a clutch band having one end connected to the driving member and movable to engage the driven member, rocker means pivoted to the driving member at a fixed point thereon, and being connected to the opposite end of the band, a lever pivoted to the driving member at a fixed point thereon, a draft link between the rocker means and lever which extends transversely of the lever fulcrum and the longitudinal axis of which is located in a plane substantially tangential to the lever fulcrum in declutched position of the parts, and in clutched position of the parts being disposed substantially in a plane diametrical to the longitudinal axis of the lever fulcrum, means for pivotally connecting said draft link to the lever at the side of the lever fulcrum opposite to its point of connection to the rocker means, and means operable to actuate said lever to move the band to clutching position.

GEORGE E. MILLER.